United States Patent [19]

Schulte et al.

[11] 4,275,033
[45] Jun. 23, 1981

[54] APPARATUS FOR PRODUCING A REACTION MIXTURE CONTAINING FILLERS FROM AT LEAST TWO COMPONENTS WHICH ARE CAPABLE OF FLOWING

[75] Inventors: Klaus Schulte, Leverkusen; Robert Peters, Cologne, both of Fed. Rep. of Germany

[73] Assignee: Bayer Aktiengesellschaft, Leverkusen, Fed. Rep. of Germany

[21] Appl. No.: 59,835

[22] Filed: Jul. 23, 1979

Related U.S. Application Data

[63] Continuation of Ser. No. 842,427, Oct. 14, 1977, abandoned.

[30] Foreign Application Priority Data

Oct. 30, 1976 [DE] Fed. Rep. of Germany ....... 2649996

[51] Int. Cl.³ ............................................. B01F 15/02
[52] U.S. Cl. .................................... 422/133; 366/156; 366/182

[58] Field of Search .................. 366/79, 83, 86, 292, 366/91, 96, 97, 84, 86, 318, 319, 320, 321, 322, 323, 324, 156, 76, 78, 182; 425/205, 376 A, 466; 422/133, 135, 131, 229

[56] References Cited

U.S. PATENT DOCUMENTS

| 2,785,455 | 3/1957 | McElroy | 366/86 |
|---|---|---|---|
| 3,261,056 | 7/1966 | Fritsch | 366/83 |
| 3,669,416 | 6/1972 | Sutter | 366/319 |
| 3,790,136 | 2/1974 | Koch | 366/86 |
| 3,892,390 | 7/1975 | Eauclaire | 259/192 |
| 3,963,558 | 6/1976 | Skidmore | 366/83 |

FOREIGN PATENT DOCUMENTS

101600 of 0000 Fed. Rep. of Germany .
6603282 of 0000 Fed. Rep. of Germany .

Primary Examiner—Robert W. Jenkins
Attorney, Agent, or Firm—Gene Harsh; Joseph C. Gil; Lyndanne M. Whalen

[57] ABSTRACT

The invention relates to an apparatus for producing a reaction mixture containing a filler from at least two components which are capable of flowing, and in particular for producing polyurethane. The filler is added to the reaction mixture dry in the form of powder, fine particles or fibers.

3 Claims, 3 Drawing Figures

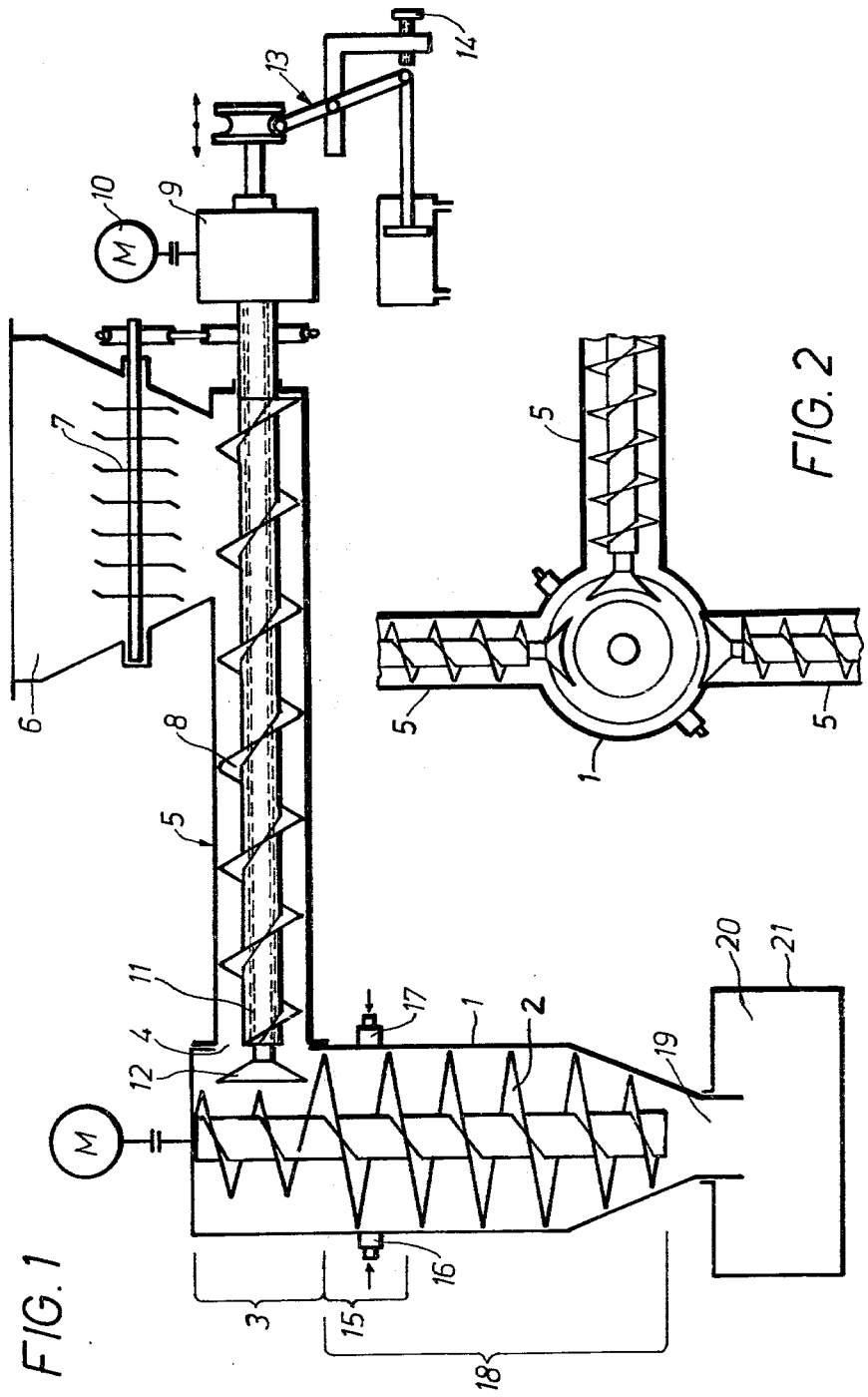

4,275,033

APPARATUS FOR PRODUCING A REACTION MIXTURE CONTAINING FILLERS FROM AT LEAST TWO COMPONENTS WHICH ARE CAPABLE OF FLOWING

This is a continuation of application Ser. No. 842,427, filed Oct. 14, 1977, now abandoned.

BACKGROUND OF THE INVENTION

Fillers are often added when polyurethane foams are being prepared in order to obtain specific properties in the finished product, to utilize scraps and to reduce the cost of the material.

Conventional fillers include cement, lime, chalk, barium sulfate, fibers, particularly glass fibers, and powder produced from crushed foam scraps.

The operation of working the fillers into the reaction components is known from experience to be accompanied by problems. With smaller proportions of filler, the viscosity is lower. When the viscosity is 40 Pa.s or less and the filler is non-abrasive, gear pumps may be used to introduce the filler into one of the components, preferbly into the polyol. With higher proportions of filler, the viscosity is higher. When the viscosity is 100 Pa.s or less and the filler is abrasive, screw pumps are used. In this case, premixing takes place with one component.

Another apparatus is known in which the filler is supplied packed in an endless tube, the tube being slit directly in front of the inlet of the mixing chamber and carried away into the chamber. The tube itself forms scrap.

The introduction of solid fillers into an agitator mixing chamber via a vibrating feed hopper is also already known.

When metering is being carried out by means of pumps, the disparity between the viscosities of the reaction components and the fillers requires a large amount of energy to effect mixing. Metering by means of pumps is therefore only suitable for continuous operations, since the high viscosity of the reaction component containing filler when compared to the very low viscosity of the other reaction component causes problems in metering the components into the mixing chamber. Furthermore, due to the high viscosity of the component containing filler, the inlet for that component may not close tightly. Faults may result in the finished formed parts when a non-continuous operation, such as filling molds, is used.

Supplying the filler by means of a tube or vibrating channel is particularly suitable for abrasive products. However, considerable problems arise in the exact metering, particularly in non-continuous operation.

The object of this invention is to provide a process and an apparatus with which fillers of any type may be introduced in high proportions by weight and in equal ratio to the other reactants and be homogeneously mixed. Continuous as well as non-continuous operation is possible, and in the case of non-continuous operation it is possible to work with almost no scrap loss.

BRIEF DESCRIPTION OF THE DRAWINGS

FIG. 1 represents a longitudinal section through the apparatus of the instant invention.

FIG. 2 represents a cross-section through the apparatus of the instant invention showing a plurality of metering screws.

DESCRIPTION OF THE INVENTION

Figure 3:
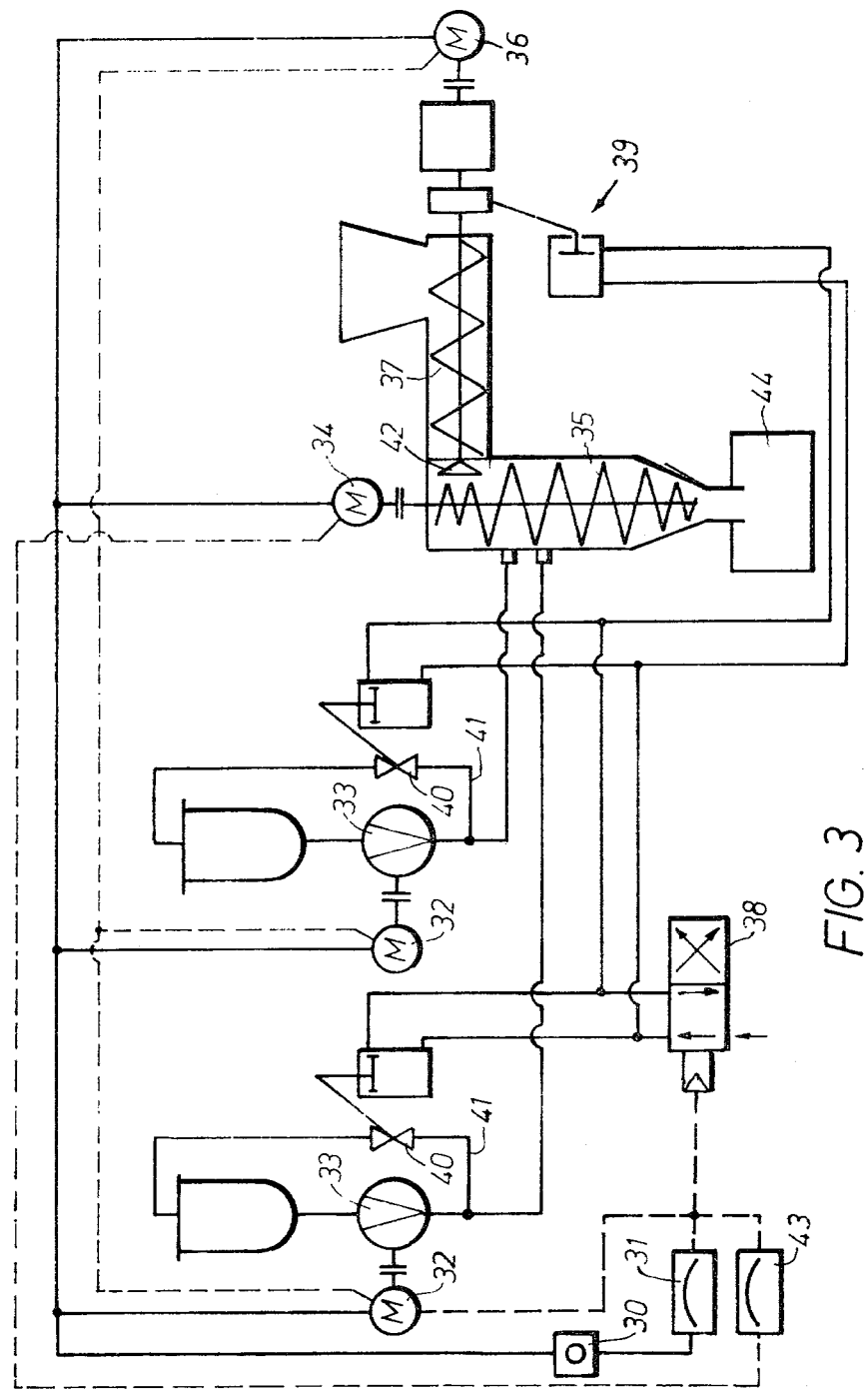
FIG. 3 illustrates the apparatus installed in the overall plant.

This object is achieved in the process by introducing the filler into an upper region of a mixing zone, so that a pressure is created in this region by rapidly carrying the filler off to a region downstream thereof, this pressure being not greater than that of the filler at the moment of introduction. The reactants are introduced into the said downstream region and are mixed simultaneously with each other and with the filler before the mixture is discharged.

This process allows relatively large quantities of filler to be introduced accurately. The filler within the mixing chamber is led from the inlet region so rapidly that a counterpressure cannot build up, as this would adversely affect the metering of the filler. All of the substances introduced are mixed thoroughly in the actual mixing region beneath the inlet region. Since the filler must pass through the inlet zone of the reactants, a homogeneous distribution in the reaction mixture is also insured throughout the operational procedure. This process is therefore particularly suitable for non-continuous operation.

The apparatus for carrying out the process comprises a housing having an agitator mixing chamber with inlets for the filler and the reaction components as well as an outlet opening. The novelty resides in the fact that a metering screw for the filler opens into the upper region of the mixing chamber, the inlets for the component opens into the region below the upper region, and the agitator comprises a screw which builds up pressure in the conveying direction.

The metering screw enables a large quantity of filler to be metered without difficulty. The upper region of the screw which builds up pressure and which serves as an agitator merely acts as a conveying element for the filler. The build up of pressure towards the outlet opening and thus the drop in pressure in the upper region, into which the filler is introduced, may be obtained by various means, which are generally known in the screw machinery industry. For example, the agitator screw may be constructed in such a way that its volumetric displacement for the total mixture is proportionately larger than the volumetric displacement of the metering screw. This can also be achieved, for example by use of appropriate numbers of revolutions per minute. A large number of revolutions per minute of the agitator screw which builds up the pressure also has the advantage of providing substantial self-cleaning of the screw.

In one particular embodiment of the invention, the shaft of the metering screw is hollow and a movable shank of a sealing member passes through it. This sealing member prevents the filler from leaving the metering screw before and after the operational procedure, so that errors in metering are avoided.

According to another particular embodiment of the apparatus according to the invention, this metering screw is provided with a funnel tube having a loosening device. This offers the advantage that any agglomerates are reduced before entering the metering screw and, in this way, the metered quantity is maintained constant.

The apparatus according to the invention preferably has several metering screws. This is advantageous if fillers which are difficult to convey or difficult to meter have to be introduced, if various fillers are to be metered simultaneously and/or if particularly large quantities of fillers are to be supplied.

An apparatus according to the invention is shown purely diagrammatically in the accompanying drawings and is described in more detail below.

In FIGS. 1 and 2, the apparatus comprises a mixing chamber housing 1 in which a rapidly rotating screw 2 which builds up pressure is arranged to act as an agitator. The inlet opening 4 of a metering screw device 5 opens into an upper region 3 of the mixing chamber. The metering screw device 5 has a funnel tube 6 with a loosening device 7 connected thereto. A hollow screw shaft 8 has a gear 9 at one end to which a drive mechanism 10 is connected. A valve shank 11 penetrates through the hollow screw shaft 8 and carries a valve disc 12 with which the inlet 4 may be closed. The other end of the valve shank 8 cooperates with a change-over device 13, the stroke of which may be adjusted by means of a regulating screw 14. An inlet region 15 of the mixing chamber for the reaction components is provided beneath the inlet area 3 for the filler. Injector nozzles 16 and 17 are provided in the inlet region 15 which is also a section of a mixing zone 18. An outlet opening 19 of the housing 1 leads into a cavity 20 of a mold tool 21.

In FIG. 2, three metering screws 5 are arranged, two of which are shown in position such that filler is being introduced into the mixing chamber.

Filler is fed from the funnel tube 6 by means of the loosening device 7 into the blades of the screw shaft 8. The screw shaft 8 mixes the filler and conveys it through the inlet opening 4 into the housing 1. The rotating screw 2 in the housing 1 mixes the filler with the reaction components that have been fed into the housing by means of injector nozzles 16 and 17. The filler and reaction components are mixed together by means of the rotating screw 2 and exit the housing through an outlet opening 19.

The mode of operation of the installation shown in FIG. 3 is as follows. When a starter button 30 is activated, a time delay relay 31, a so-called foaming time clock, is actuated. Simultaneously, the drive mechanisms 32 of the pumps 33 for conveying the reaction components begin to operate, and the drive mechanism 34 of the agitator 35 and the drive mechanism 36 of the metering screw 37 are also actuated. An air passage valve 38 is connected to a pneumatic monitoring device 39 in such a way that delivery valves 40 in delivery pipes 41 are closed. A sealing valve 42 of the metering screw 37 is also opened by the pneumatic monitoring device 39.

Once the time interval to which the foaming time clock 31 is adjusted has elapsed, then all of the procedures described are reversed. Only the drive mechanism 34 of the agitator 35 continues to operate, while a further time delay relay 43 is actuated by the foaming time clock 31, this time delay relay being adjusted to a time interval which ensures that the mixture contained in the mixing chamber is completely carried out into the mold tool 44. Once this time interval has elapsed, the plant is ready for another mold tool filling operation.

By using the apparatus described herein, foams containing fillers may be produced for example for the following purposes by the process according to the invention:

EXAMPLES

EXAMPLE 1

Mats for the car industry, for displaying the motor vehicles, are coated with a heavy foam. The following composition is used for this purpose:
100 parts by weight of polyol,
25 parts by weight of isocyanate,
300 parts by weight of barium sulphate or chalk.

It was used the apparatus according to FIG. 1 of the drawing. 3.33 kg/min polyol were fed through nozzles 16, 0.73 kg/min isocyanate through nozzle 17 and 10 kg/min barium sulphate or chalk) were fed by the metering screw device 5. The mixture was discharged with an amount of 14.06 kg/min. The apparatus had the following datas:

| 1. | Metering Screw Device: | |
|---|---|---|
| 1.1 | Pitch | 43 mm |
| 1.2 | Worm depth | 9 mm |
| 1.3 | Screw diameter | 46 mm |
| 1.4 | Revolutions | 300 U/min |
| 2. | Largest Rotating Screw: | |
| 2.1 | Diameter of the mixing chamber = diameter of the rotating screw | 48 mm |
| 2.2 | Height of the mixing chamber | 390 mm |
| 2.3 | Distance from the center of the inlet opening for fillers to the center of the nozzles | 40 mm |
| 2.4 | Effective length of rotating screw (lower edge of the filler inlet opening to the end of the rotating screw) | 350 mm |
| 2.5 | Length of the conical part of the rotating screw | 40 mm |
| 2.6 | Diameter at the small end of the cone | 35 mm |
| 2.7 | Pitch | 18 mm |
| 2.8 | Worm depth at the cylindrical part | 15 mm |
| 2.9 | Revolutions | 3500 U/min |
| 2.10 | Diameter of the outlet of the mixing chamber | 25 mm |

EXAMPLE 2

Porous concrete with the following composition produced for manufacturing structural elements:
100 parts by weight of water glass,
100 parts by weight of isocyanate,
100 parts by weight of lime or cement.

It was used the apparatus according to FIG. 1 of the drawing. 12 kg/min polyol were fed through nozzle 16, 12 kg/min isocyanate through nozzle 17 and 12 kg/min lime (or cement) were fed by the metering screw device 5. The mixture was discharged in an amount of 36 kg/min. The apparatus had the following datas:

| 1. | Metering Screw Device: | |
|---|---|---|
| 1.1 | Pitch | 55 mm |
| 1.2 | Worm depth | 14 mm |
| 1.3 | Screw diameter | 46 mm |
| 1.4 | Revolutions | 300 U/min |
| 2. | Largest Rotating Screw: | |
| 2.1 | Diameter of the mixing chamber = diameter of the rotating screw | 48 mm |
| 2.2 | Height of the mixing chamber | 390 mm |
| 2.3 | Distance from the center of the inlet opening for fillers to the center of the nozzles | 40 mm |
| 2.4 | Effective length of rotating screw (lower edge of the filler inlet opening to the end of the rotating screw) | 350 mm |
| 2.5 | Length of the conical part of the rotating screw | 40 mm |

| | | |
|---|---|---|
| | -continued | |
| 2.6 | Diameter of the small end of the cone | 35 mm |
| 2.7 | Pitch | 18 mm |
| 2.8 | Worm depth at the cylindrical part | 15 mm |
| 2.9 | Revolutions | 3500 U/min |
| 2.10 | Diameter of the outlet of the mixing chamber | 25 mm |

EXAMPLE 3

In order to increase the thermal stability of rigid integral foam, glass fibers of different lengths and dressings are added to the reaction mixture. The following composition is used:

100 parts by weight of polyol,
about 130 parts by weight of isocyanate,
  8 parts by weight of blowing agent,
  6 parts by weight of glass fibers having
    lengths of from 0.3 to 8 mm.

EXAMPLE 4

It was used the apparatus according to FIG. 1 of the drawing. 33 kg/min polyol were fed through nozzle 16, 47 kg/min isocyanate were fed through nozzle 17 together with 2.75 kg/min of a blowing agent and 2 kg/min glass fibers having lengths of from 0.3 to 8 mm were fed by the metering screw device 5. The apparatus had the following datas:

| | | |
|---|---|---|
| 1. | Metering Screw Device: | |
| 1.1 | Pitch | 55 mm |
| 1.2 | Worm depth | 18 mm |
| 1.3 | Screw diameter | 56 mm |
| 1.4 | Revolutions | 450 U/min |
| 2. | Largest Rotating Screw: | |
| 2.1 | Diameter of the mixing chamber = diameter of the rotating screw | 650 mm |
| 2.2 | Height of the mixing chamber | 450 mm |
| 2.3 | Distance from the center of the inlet opening for fillers to the center of the nozzles | 50 mm |
| 2.4 | Effective length of rotating screw (lower edge of the filler inlet opening to the end of the rotating screw) | 400 mm |
| 2.5 | Length of the conical part of the rotating screw | 60 mm |
| 2.6 | Diameter of the small end of the cone | 45 mm |
| 2.7 | Pitch | 18 mm |
| 2.8 | Worm depth at the cylindrical part | 20 mm |
| 2.9 | Revolutions | 3500 U/min |
| 2.10 | Diameter of the outlet of the mixing chamber | 50 mm |

What is claimed is:

1. An apparatus for producing a polyurethane foam reaction mixture containing filler from at least two components capable of flowing, comprising:
    (a) a housing with a channel entering the upper zone, side inlets, and an outlet in the lower zone;
    (b) a metering screw for mixing and conveying the filler, within the channel of said housing entering the upper zone;
    (c) injection nozzles for feeding the at least two components into the side inlets of said housing;
    (d) an agitator within said housing, which is substantially at a right angle to said metering screw, for mixing the filler and at least two components;
    (e) means for rotating said metering screw and said agitator; and
    (f) means on said metering screw for closing the channel entering the upper zone of said housing, and thereby regulating the flow of filler.

2. An apparatus for producing a polyurethane foam reaction mixture containing filler from at least two components capable of flowing, comprising:
    (a) a housing with a channel entering the upper zone, side inlets, and an outlet in the lower zone;
    (b) a metering screw for mixing and conveying the filler, within the channel of said housing entering the upper zone, wherein said metering screw has a hollow shaft containing a movable shank with a sealing member on the end for preventing filler from the channel of said housing before and after the operation procedure;
    (c) injection nozzles for feeding the at least two components into the side inlets of said housing;
    (d) an agitator within said housing, which is substantially at a right angle to said metering screw, for mixing the filler and at least two components; and
    (e) means for rotating said metering screw and said agitator.

3. An apparatus for producing a reaction mixture containing fillers from at least two components which are capable of flowing, for manufacturing polyurethane, comprising:
    (a) a housing having an agitator mixing chamber with inlets for the filler and the reaction components as well as an outlet opening;
    (b) a first screw within said housing for building up pressure in the conveying direction and mixing the filler and reaction components; and
    (c) a metering screw, which is substantially at a right angle to said first screw, for conveying and agitating the filler into the upper region of said housing, wherein said metering screw further comprises a sealing member so that filler will not enter said housing when said sealing member is closed.

* * * * *